US006537382B1

(12) United States Patent
Bartram et al.

(10) Patent No.: US 6,537,382 B1

(45) Date of Patent: Mar. 25, 2003

(54) DECONTAMINATION METHODS FOR TOXIC CHEMICAL AGENTS

(75) Inventors: Philip W. Bartram, Bel Air, MD (US); George W. Wagner, Elkton, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 98 days.

(21) Appl. No.: 09/742,870

(22) Filed: Dec. 21, 2000

Related U.S. Application Data

(60) Provisional application No. 60/230,366, filed on Sep. 6, 2000.

(51) Int. Cl.[7] .............................. A62D 3/00; B08B 7/00

(52) U.S. Cl. ................................ 134/7; 134/6; 134/42; 588/200

(58) Field of Search ............................. 588/200; 134/6, 134/7, 42

(56) References Cited

U.S. PATENT DOCUMENTS 4,950,311 A * 8/1990 White, Jr. .................... 95/122
5,058,578 A * 10/1991 Weiss .................... 128/201.25
5,281,259 A * 1/1994 Markovs ..................... 423/210

FOREIGN PATENT DOCUMENTS

GB 2331298 A * 5/1999

OTHER PUBLICATIONS

CA 101:218286, 1984.*

CA 119:145538, 1993.*

* cited by examiner

*Primary Examiner*—Alexander Markoff

(74) *Attorney, Agent, or Firm*—Ulysses John Biffoni

(57) ABSTRACT

The invention provides novel methods of detoxifying highly toxic chemicals, and treating surfaces contaminated, or potentially contaminated, with toxic chemical agents such as chemical warfare agents and/or industrial toxins. The methods employ silver-exchanged zeolites and sodium zeolites as reactive sorbents to degrade such agents or toxins on contact, in solution or vapor form.

11 Claims, 2 Drawing Sheets

DECONTAMINATION METHODS FOR TOXIC CHEMICAL AGENTS

This application is a continuation of Provisional Patent Application Ser. No. 60/230,366, filed on Sep. 6, 2000, the disclosure of which is incorporated by reference herein, in its entirety.

U.S. GOVERNMENT INTEREST

The invention described herein may be manufactured, used and licensed by or for the United States Government.

FIELD OF THE INVENTION

This invention relates to reactive sorbents and methods of making and using the same for the decontamination of surfaces contaminated with highly toxic materials, including chemical warfare ("CW") agents and/or industrial chemicals, insecticides, and the like. More particularly, the invention relates to improvement of surface decontamination processes and reagents by the development of novel sorbents and sorbent preparation methods, including compositions comprising sodium zeolite (NaY) and silver exchanged zeolite (AgY).

BACKGROUND OF THE INVENTION

Exposure to toxic agents, and especially CW agents, and.related toxins, is a potential hazard to the armed forces and to civilian populations, since CW agents are stockpiled by several nations, and other nations and groups actively seek to acquire these materials. Some commonly known CW agents are bis-(2-chloroethyl) sulfide ("HD" or mustard gas), pinacolyl methylphosphonofluoridate ("GD"), 0-ethyl S-(2-diisopropyamino)ethyl methylphosphonothiolate ("VX"), and isopropyl methylphosphonofluoridate, or Sarin ("GB") as well as analogs and derivatives of these agents. Although originally introduced in WWI, mustard gas has been used in recent times, as have the newer and more deadly nerve agents VX and GB (Zurer, 1998*, Chem. and Eng. News* 76: 7; Black, et al., 1994 *J. Chromatogr. A* 662: 301–321; Black, et al., 1993 *J. Chromatogr. A* 637: 71–80; Rouhi, 1999 *Chem. and Eng. News* 77: 37; Ember, *Chem. and Eng. News* 76: 6–7).

These CW agents are generally delivered as fine aerosol mists which, aside from presenting an inhalation threat, will deposit on surfaces of military equipment and hardware, including uniforms, weapons, vehicles, vans and shelters. Once such equipment and hardware is contaminated with one of the previously mentioned highly toxic agents, the agent must be removed in order to minimize contact hazards.

For this reason, there is an acute need to develop and improve technology for decontamination of highly toxic materials. This is especially true for the class of toxic materials known as nerve agents or nerve gases that are produced and stockpiled for both industrial use and as CW agents. Simply by way of example, one class of nerve agents with a high level of potential lethality is the class that includes organophosphorus-based ("OP") compounds, such as Sarin, Soman, and VX. Such agents can be absorbed through inhalation and/or through the skin of an animal or person. The organophosphorus-type ("OP") CW materials typically manifest their lethal effects against animals and people by inhibiting acetylcholine esterase ("AChE") enzyme at neuromuscular junctions between nerve endings and muscle tissue to produce an excessive buildup of the neurotransmitter acetylcholine, in an animal or person. This can result in paralysis and death in a short time.

CW agents and related toxins are so hazardous that simulants have been developed for purposes of screening decontamination and control methods. These simulants include, e.g. 2-chloroethylphenyl sulfide (CEPS), an HD simulant, dimethyl methylphosphonate (DMMP), a G-agent simulant, and O,S-diethyl phenylphosphonothioate (DEPPT) a VX simulant.

One approach to cleanup and decontamination of the highly toxic agents is to develop various types of sorbents to trap and hold the CW agents to facilitate their removal. For example, the U.S. Army uses a nerve agent decontamination solution, DS2, which is composed (by weight) of 2% NaOH, 28% ethylene glycol monomethyl ether, and 70% diethylenetriamine (Richardson, G. A. "Development of a package decontamination system," EACR-1 310–17, U.S. Army Edgewood Arsenal Contract Report (1972), incorporated by reference herein). Although this decontamination solution is effective against OP nerve agents, it is quite toxic, combustible, highly corrosive, and releases toxic by-products into the environment.

Another decontamination material, used as an alternative to DS2, is XE555 sorbent (Ambergard™ Rohm & Haas Company, Philadelphia, Pa.). XE555 is presently being used by the military for immediate decontamination applications. However, XE555 has several disadvantages. Although effective at removing chemical agents, XE555 does not possesses sufficient reactive properties to neutralize the toxic agent(s) picked up by this sorbent. Thus, after use for decontamination purposes, XE555 itself presents an ongoing threat from off-gassing toxins and/or vapors mixed with the sorbent.

It would be desirable to have a sorbent that is reactive, which degrades or decontaminates the toxic agent after adsorbing or absorbing the agent. There are reports that such "reactive sorbents" are being developed for the decontamination of chemical warfare agents, including those by, Yang, Y. -C., et al. 1992 *Chem. Rev.*, 92;1729–1743; Yang, Y. -C., 1995 *Chem. Ind.*, 334–337; Ekerdt, et al., 1988*, J. Phys. Chem.* 92: 6182–6188; Wagner, et al., 1999 *J. Phys. Chem. B*, 103; 3225–3228; Spafford, R. B. *The Development of a Reactive Sorbent for Immediate Decontamination, ERDEC-CR*-218, U.S. Army ERDEC: Aberdeen Proving Ground, Md., 1996.

However, to date, none of these reports has described a useful and effective reactive sorbent for the most toxic CW agents, such as VX, HD and GD.

Chemical reactions for neutralizing CW agents are known, although they have not proved useful for decontamination. For example, it has been shown that VX and HD decompose on sorbents impregnated with AgF (Ekerdt, et al, 1988*, J. Phys. Chem.* 1988, 92:6182–6188) and gaseous HD decomposes on 13X zeolite (Bellamy, 1994*, J. Chem. Soc. Perkin Trans.* 2:2325–2328). AgF is currently used to transform VX vapor into its more volatile G-analog, ethyl methylphosphonofluoridate, to facilitate its detection by air monitoring equipment (Spafford, 1996, "The Development of a Reactive Sorbent for Immediate Decontamination," ERDEC-CR-218, U.S. Army ERDEC: Aberdeen Proving Ground, Md.). This reaction is not useful for decontamination purposes, because corrosive HF byproduct also forms, although the reaction mechanism is apparently not completely known (Spafford, 1996, Id.).

For HD vapor on 13X zeolite, Bellamy, 1994 (*J. Chem. Soc. Perkin Trans.* 2:2325–2328) tentatively assigned a product detected by $^{13}C$ MAS NMR to the sulfonium ion CH—TG. CH—TG is formed from the chlorohydrin (CH) and thiodiglycol (TG) hydrolysis products of HD (Yang, Y. -C. et al., 1988, *J. Org. Chem.* 53:3293–3297). The predominate formation of CH—TG from HD sorbed in soil by $^{13}C$ MAS NMR has similarly been reported (Wagner et al., 1998, *Langmuir* 14:6930–6934). This pathway is illustrated by the following reaction scheme. (see Yang, et al., 1988, J. *J. Ore. Chem.* 53:3293–3297).

least one derivative that is substantially nontoxic, relative to the toxic agent.

Preferably, the silver zeolite or sodium zeolite is present for a time ranging from about 1 minute to about 60 days, and at a temperature ranging from about −30° C. to about 50° C. It is also preferred that the silver zeolite have a silver content

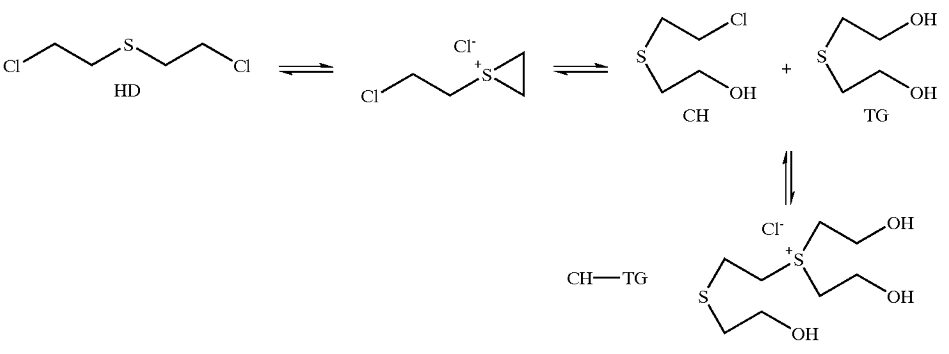

HD

CH

TG

CH—TG

Although a number of metal ions are known to catalyze G-agent hydrolysis (Courtney, et al., 1957 *Am. Chem. Soc.* 79:3030–3036; Epstein, et al., 1958 *J. Am. Chem. Soc.* 80:3596–3598), with the possible exception of the AgF reaction, demonstrative examples of metal-catalyzed hydrolysis of VX appear to be lacking (Yang, Y. -C. 1999, *Acc. Chem. Res.* 32:109–115). Indeed, in perhaps the sole example, the hydrolysis of VX in buffered solutions of TMEN [N,N,N',N'-tetrariethylethylenediamine] copper (II) complexes (Albizo, et al., 1987, In *Proceedings of the* 1986 *CRDEC Scientific Conference on Chemical Defense Research, Vol. I, CRDEC-SP*-87008, U.S. Army CRDEC: Aberdeen Proving Ground, Md., pp. 105–109), it is speculated that catalysis may be inhibited by competing complexation of the diisopropylamino group of VX (Yang, et al., 1992, *Chem. Rev.*, 92:1729–1743).

Silver possesses a strong affinity for the complexation of sulfur-containing ligands (Cotton, et al., 1988, In *Advanced Inorganic Chemistry*, $5^{th}$ ed., John Wiley & Sons, New York, pp. 942–943), and $Ag^+$ has been shown to promote the hydrolysis of diethyl ethylphosphonothioate (Saville, B. 1957 "Cation Assisted Nucleophilic Displacements on Phosphorus, Porton Technical Paper No. 608," *Chemical Defense Experimental Establishment*: Porton Down, UK, [unclassified]).

Despite these reports, there remains a need in the art for even more effective compositions and methods for detoxifying CW agents.

SUMMARY OF THE INVENTION

In order to solve these and other problems in the art, the present invention provides the novel compositions suitable for use as "reactive sorbents" and methods for preparing and using these novel reactive sorbents to decontaminate a wide range of highly toxic materials. The reactive sorbents of the invention are, for example, based on the interaction of a silver-exchanged zeolite (AgY) or sodium zeolite (NaY) with the sulfur-containing agents VX and HD.

In a first embodiment, the invention broadly provides a method of detoxifying chemical warfare agents, by a process including the steps of: contacting a material that includes, or potentially includes, at least one toxic agent, e.g., a chemical warfare agent, with a quantity of silver zeolite sufficient for reacting substantially all of the toxic agent to produce at ranging from about 10 to about 40% wt/wt, and that it is in a form suitable for application to objects, surfaces and such, as required.

Suitable forms for applying silver zeolite or sodium zeolite include, for instance, a powder, pellets, a granulate, a slurry comprising a silver zeolite powder suspended in a compatible solvent, and/or combinations thereof. The term, "compatible solvent" should also be understood to include both polar and nonpolar solvents, such as organic solvents, as well as optional miscibility enhancers such as, e.g., detergents, surface active agents, and the like. A compatible solvent is also preferably selected to be miscible with the toxic material and/or any carriers, solvents and/or polymers included with the toxic material.

The inventive methods are preferably applied to treat and substantially decontaminate such toxic. agents as: bis-(2-chloroethyl) sulfide; 0-ethyl S-(2-diisopropylamino)ethyl methylphosphonothiolate; pinacolyl methylphosphonofluoridate; isopropyl methylphosphonofluoridate, and/or combinations thereof.

It has also been determined that employing the methods of the invention, the breakdown products of bis-(2-chloroethyl) sulfide include thioxane, and the breakdown products of O-ethyl S-[2-diisopropylethylamino] methylphosphonothiolate) include O-[2-diisopropylethylamino] O-ethyl methylphosphonate. In addition, the breakdown products of 0-ethyl S-(2-diisopropylamino)ethyl methylphosphonothiolate and/or pinacolyl methylphosphonofluoridate, include phosphonates.

The toxic agent or material, e.g., the chemical warfare agent, is optionally present in liquid and/or vapor form. When the toxic agent to be treated is in liquid form, the liquid can be on a surface, and optionally further includes a polymer that renders the chemical warfare agent as a viscous gel material. Under field conditions, i.e., where highly toxic agents have been applied to the ground, buildings, vehicles, etc., deliberately or by accident, the concentrations will optionally range from, for instance, less than 0.1 gram/meter$^2$ (g/m$^2$) to 15 g/m$^2$. When the toxic material is a liquid or solid, e.g., pesticides, the liquid can be on a surface, and further is optionally a component within a compatible solvent, e.g., lactones, ethers, alcohol, hydrocarbons and mixtures thereof. The toxic material is sometimes mixed with a polymer that is present, e.g. in a concentration ranging from about 1.0 percent by weight to about 10 percent by weight. Thus, the chemical warfare is present in such toxic material in a concentration ranging from about 90 percent by weight to about 99 percent by weight.

The methods of the invention are readily applied to toxic agents, e.g., chemical warfare agents, in an industrial setting for disposal of such agents. The methods of the invention are also optionally applied to materials that are contaminated, or potentially contaminated that include, e.g., an article of manufacture, a solid composition, a liquid composition, a vapor or gas composition, and combinations thereof. In particular, the methods of the invention are readily applied to contaminated or potentially contaminated items such as, e.g., a vehicle, a weapon or weapon system, pavement, soil, vegetation, a garment, a tent, a building and/or combinations thereof.

DETAILED DESCRIPTION OF THE PREFERRED EMBODIMENTS

Figure 1:
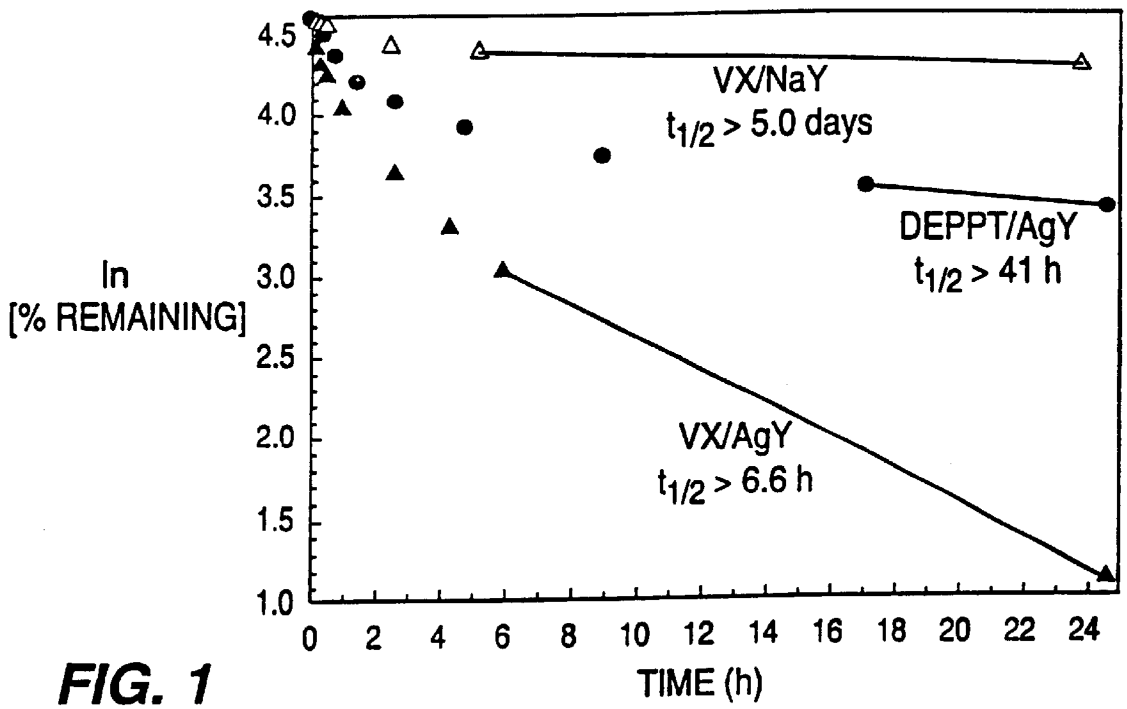
FIG. 1. Reaction profiles are plotted as (natural) log of the % of the initial substance remaining (Y-axis) against time (hours, X-axis), for VX and DEPPT reactions conducted on AgY and NaY, respectively. The curves are labeled as follows: VX on NaY having a $t_{1/2}$ of greater than 5 days (open triangles); DEPPT on AgY having a $t_{1/2}$ of greater than 41 hours (solid circles); VX on AgY having a $t_{1/2}$ of greater than 6.6 hours (solid triangles).

Accordingly, the invention provides methods and reagents for removing and deactivating a wide range of highly toxic materials, including CW agents. In order to appreciate the scope of the invention, the terms "toxin," "toxic agent," and "toxic material," are in tended to be equivalent, unless expressly stated to the contrary.

In addition, reference herein to a toxic agent is intended to encompass CW agents, including, e.g., toxic organophosphorus-type agents, mustard gas and derivatives, and similar such art-known toxins. In addition, unless otherwise stated, the term toxic agent as used herein is also intended to include toxic industrial chemicals, including, but not limited to, organophosphorus-type insecticides, and the like. In particular, the terms, "nerve gas," "nerve agent," "neurotoxic," and the like are intended to be equivalent, and to refer to a toxin that acts or manifests toxicity, at least in part, by disabling a component of an animal nervous system, e.g., ACHE inhibitors, as discussed supra.

Further, the use of a term in the singular is intended to encompass its plural in the appropriate context, unless otherwise stated. The use of a term in the plural is intended to encompass the singular, in the appropriate context, unless otherwise stated.

Broadly, the methods provided.by the invention employ reactive sorbents effective for removing, and then deactivating, toxic agents, as defined sutpra. Reactive sorbents according to the invention include compositions that sorb, or take up toxic agents, and then deactivate a portion of the taken up toxic agent. Thus, the combination of the sorbent and toxic agent is rendered safer to handle after a period of time, relative to the combination of the same amount of toxin under the same conditions with an otherwise equivalent sorbent lacking reactive or degradative properties.

The reactive sorbents employed in the methods of the invention are based on zeolite materials. Zeolite is a naturally occurring adsorbent mineral that is available from a number of commercial sources. Zeolites are a type of mineral composed of hydrated aluminum silicates of alkali metals and alkaline earth metals, e.g., sodium zeolite, and are available in natural and synthetic forms. In particular, the reactive sorbents of the invention include silver exchanged zeolites, hereinafter referred to as, "silver zeolite," and sodium zeolites. Preferably, these silver zeolites are zeolites that have been prepared by an ion exchange process to include silver, ranging in proportion, e.g., from about 10 to about 40 percent (by weight) silver, or greater. More preferably, the silver content ranges, e.g., from about 20–25% silver, by weight. Optionally, the zeolites also include water, e.g., ranging from a trace to about 25 percent, by weight. More typically, the zeolites employed according to the invention will include, on average, about 15% water. Simply by way of example, Sigma-Aldrich (St. Louis, Mo.) supplies silver exchanged zeolite under the following product numbers: 517984: 1.6 mm pellets, $Ag_{7.6}Na_{0.4}[(AlO_2)_8(SiO_2)_{40}].xH_2O$ with Ag ranging from 35 to 40 weight percent, water at about 7 weight percent, density of 1.070; product No. 382299: 1.6 mm pellets, $Ag_{7.6}Na_{0.4}[(AlO_2)_8(SiO_2)_{40}].xH_2O$ with Ag ranging from 15 to 20 weight percent, water at about 7 percent, density of 0.920; and product No. 382280: +20 mesh, granular, $Ag_{84}Na_2[(AlO_2)_{86}(SiO_2)_{106}].xH_2O$, among other art-known forms of this material.

In particular, the examples provided below employ silver exchanged zeolite identified in the Aldrich catalog as No. 36,660–9, and sodium zeolite, identified in the Aldrich catalog as No. 33,444-8 (Aldrich catalog, 1996–1997 edition, incorporated by reference herein)

The reactions of VX, HD, DEPPT and CEPS with silver-exchanged (AgY) zeolites were studied using solid-state magic angle spin ("MAS") NMR and gas chromatography-mass spectroscopy ("GC-MS"). The products resulting from the reactions of these agents on AgY were compared to the products resulting from NaY. The reactions were conducted as set forth in the Examples below, and the following results obtained.

1. Reactions on Sodium Zeolite or NaY

On NaY, simple hydrolysis reactions were observed for VX,HD and CEPS. No reaction on NaY occurred for DEPPT, which was observed to merely migrate into the NaY zeolite cage intact. Migration of intact VX into the NaY zeolite cage was also observed. Significantly, VX hydrolysis did not yield toxic EA-2192 due to P—O cleavage, as illustrated by the following scheme:

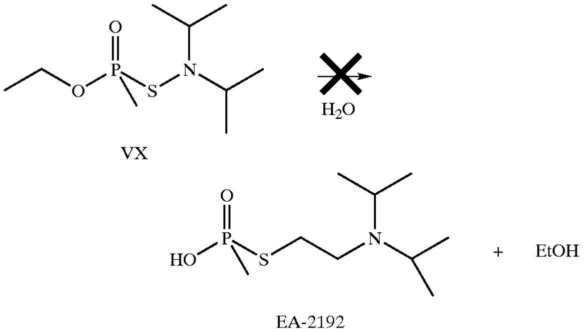

VX

EA-2192 which commonly occurs under basic conditions (Yang, 1999, *Acc. Chem. Res.* 32:109–115).

Yang et al., 1996 (*J. Org. Chem.*, 61:8407–8413) have reported similar selective hydrolysis for VX added to an equimolar amount of neutral water. The results for HD, where only CH—GT was formed (see Yang, et al., 1988, Id. supra) confirm the similar findings of Bellamy, 1994 (*A. J. Chem. Soc. Perkin Trans.* 2:2325–2328) for HD vapor on 13X zeolite. Whereas VX yields non-toxic EMPA on NaY, the CH—GT product afforded by HD is still toxic (Stahman, et al., 1946, *J. Org. Chem.* 11:704–718). Thus, the Examples provided hereinbelow confirm that NaY (or 13X) is not suitable for the decontamination of VX, at least at ambient temperatures, but surprisingly, that NaY is effective against HD.

2. Reactions on Silver Zeolite or AgY

For AgY, quite different products were found for VX, HD and CEPS than are described above for the same substrates reacted on NaY. Only DEPPT yielded the expected simple hydrolysis product. However, as was seen for VX on both NaY and AgY, the DEPPT hydrolysis was quite selective, yielding only EPPA via cleavage of the P—S bond (no P—O cleavage product was detected). Without meaning to be bound by any theory or hypothesis, a silver-catalyzed mechanism for DEPPT hydrolysis may be proposed, as shown in the following scheme.

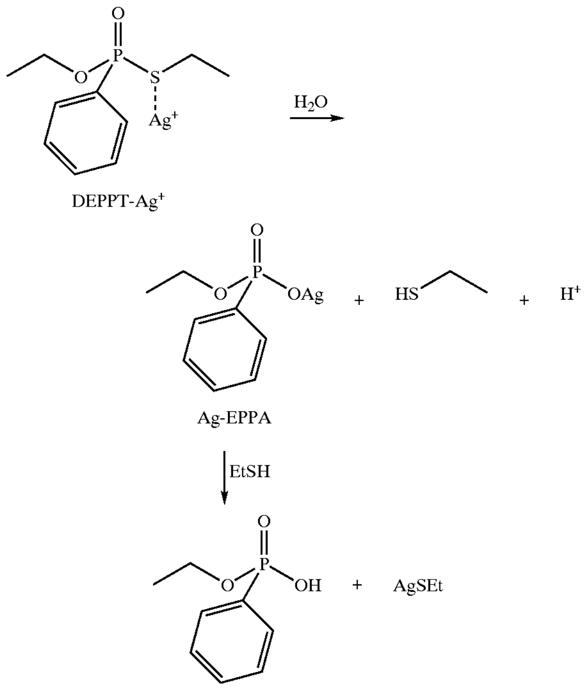

DEPPT-Ag+

Ag-EPPA

EPPA

The reaction illustrated above is believed to be fast, since intrazeolite DEPPT and DEPPT-$Ag^+$ were not observed. The intermediate Ag-EPPA salt was evidently slowly attacked by ethanethiol to liberate EPPA and form silver ethylmercaptide (AgSEt). Such a reaction has previously been observed in solution between $AgNO_3$ and $MeSP(O)(OMe)_2$ to yield AgSMe by Emmett, et al., 1911 (*J. Chem. Soc*:713–720).

For CEPS on AgY, exclusive ether formation occurred to form a single product $PhSCH_2CH_2OCH_2CH_2SPh$. Without meaning to be bound by any theory or hypothesis, a mechanism may be proposed as illustrated by the following scheme.

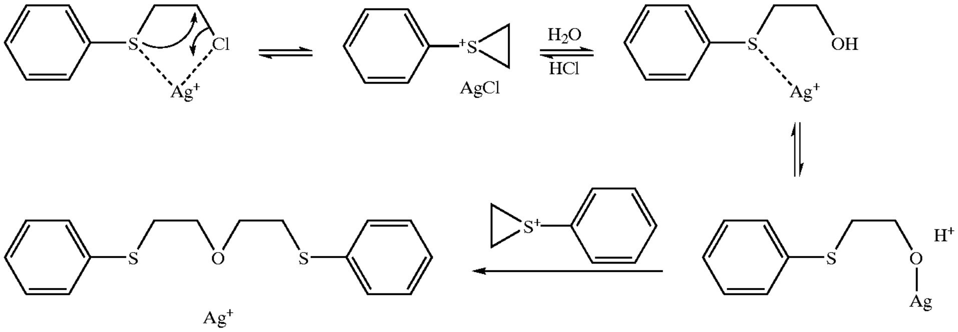

A silver alkoxide intermediate has been proposed in the formation of cyclic ethers from alcohols by silver acetate by March, 1977 (*Advanced Organic Chemistry*, $2^{nd}$ ed., McGraw-Hill: New York, p.643).

A similar reaction may be envisioned for HD to form 1,4-thioxane as shown in the next scheme:

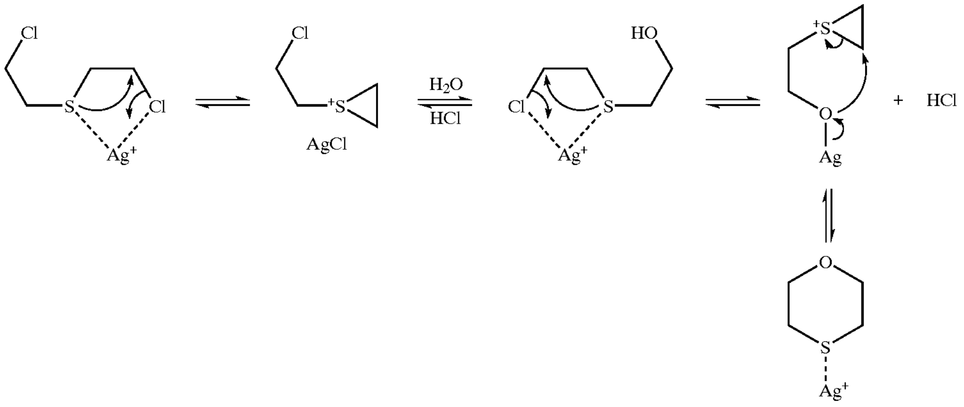

AgCl

The silver alkoxide intermediate is consistent with the elimination of HCl from HD to yield the vinyl products.

Similar to DEPPT, a silver-catalyzed mechanism may be proposed for VX as shown in the following scheme, resulting in the initial formation of the proposed Ag-EMPA salt.

VX, as shown in the next scheme, below, that results in the initial formation of the proposed Ag-EMPA salt. The formation and reaction of the VX-$Ag^+$ complex was apparently fast since intrazeolite VX and the complex itself were not observed by MAS-NMR (data not shown).

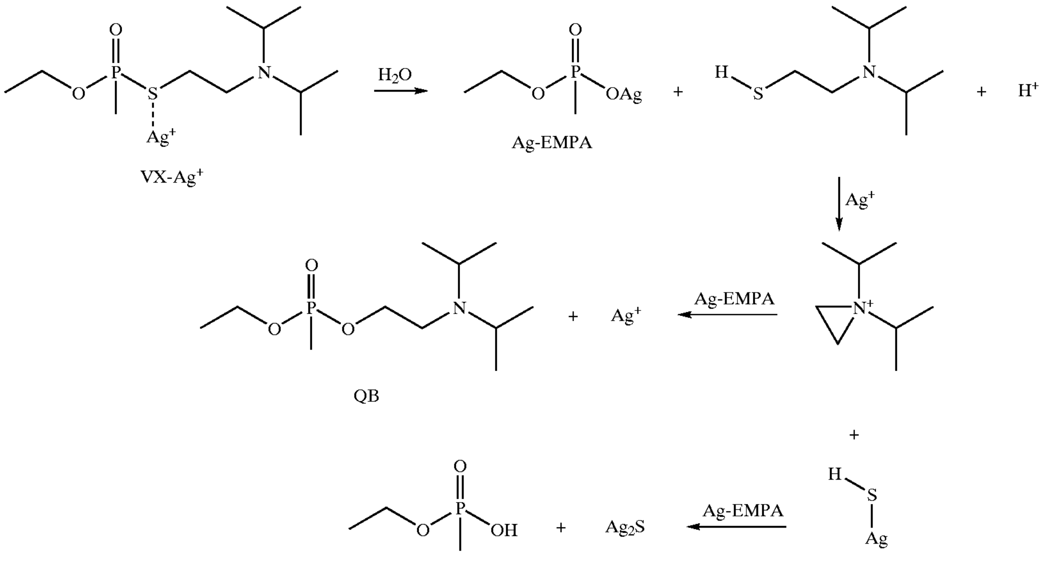

VX-$Ag^+$

Ag-EMPA

QB

EMPA

As illustrated by the above-suggested reaction scheme for DEPPT, a silver-catalyzed mechanism may be proposed for

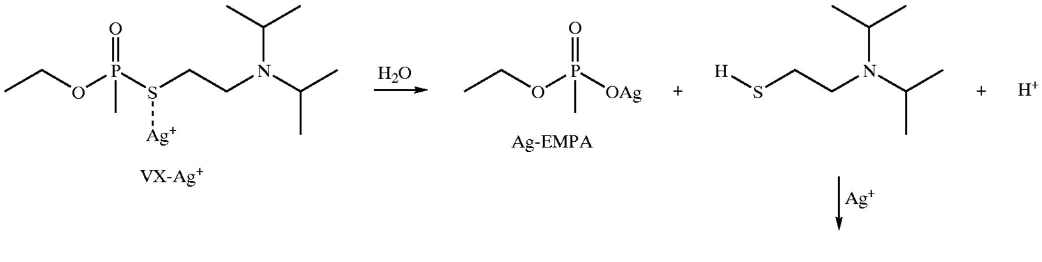

VX-$Ag^+$

Ag-EMPA

-continued

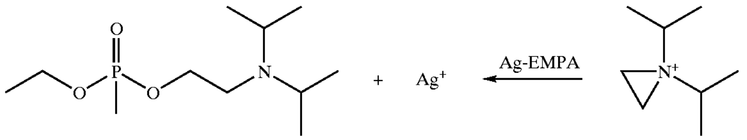

QB

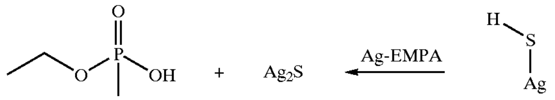

EMPA

As illustrated by the above scheme, it is believed that, in order to effect the formation of QB, the cleaved thiol must undergo a desulfurization step, resulting in the formation of the reactive cyclic ammonium ion. Subsequent reaction of this latter species with Ag-EMPA generates QB. The ultimate fate of the sulfur is believed to be the formation of $Ag_2S$ as shown. In the reaction scheme below. This latter reaction of sulfur with silver may compete with the cyclic ammonium ion for available Ag-EMPA. The liberated EMPA is then hypothesized to bind to the framework or surface, rendering it inert towards reaction with the cyclic ammonium ion. These side-reactions would account for the non-quantitative yield of QB, which was about 78%.

It is unclear whether the VX reaction with.AgF involves an initial hydrolysis step prior to formation of the phosphonofluoridate (Spafford, R. B., 1996*, The Development of a Reactive Sorbent for Immediate Decontamination, ERDEC-CR*-218, U.S. Army ERDEC: Aberdeen Proving Ground, Md.). Thus, the reaction of VX with AgY, where the hydrolyzed intermediate Ag-EMPA was clearly evident in $^{31}P$ MAS NMR spectra (not shown), may be the first example of a metal-catalyzed hydrolysis of VX.

Considering the products formed by HD on AgY, divinyl sulfide is a known irritant, and 1,4-thioxane is also listed as an irritant. However, these compounds possess exceedingly less vesicant activity than HD. Indeed, divinyl sulfide is the major product produced by the currently-fielded decontaminant or "decon" solution DS2, (Yang, et al.,1992 *Chem. Rev.* 1992, 92:1729–1743; Davis, et al., 1975 *Studies on the Destruction of Toxic Chemical Agents VX and HD by the All Purpose Decontaminants DS*-2 and CD-1, EC-TR-75024, U.S. Army ERDEC:

Aberdeen Proving Ground, 1975. [UNCLASSIFIED]). Thus, these products may be acceptable in a sorbent-based decontaminant.

Regarding the VX products, EMPA is non-toxic, but the final product QB retains moderate toxicity with reported $LD_{50}$'s of 75 mg/kg (rabbit IV) and >300 mg/kg (rabbit, percutaneous), although it is perhaps more than three orders of magnitudes less toxic than VX (10 mg/70 kg man, percutaneous) (VX Material Safety Data Sheet, U.S. Army ERDEC: Aberdeen Proving Ground, Md., 1988).

Under industrial guidelines (Smith, et al., *Fundamentals of Industrial Hygiene*, 3rd ed., B. A. Plog, ed., p.365), the percutaneous toxicity of QB would classify it as being borderline moderately toxic (44 mg-340 mg, $LD_{50}$, rabbit, percutaneous) to slightly toxic (350–2810 mg/kg, $LD_{50}$, rabbit, percutaneous). Thus, the examples provided hereinbelow confirm that treatment with AgY effectively decontaminates VX, and reduces the toxicity of HD by several orders of magnitude.

3. Application of Reactive Sorbents to Contaminated Surfaces

The methods of the present invention can be carried out by spraying, rubbing, brushing, dipping, dusting, or otherwise contacting the reactive sorbents of the invention with a surface or composition that is believed to be in need of such treatment, e.g., because it is, or might be, contaminated with a toxic agent that the reactive sorbent will remove and/or deactivate.

In one embodiment of the invention, the reactive sorbent is dispersed as a suspension in a suitable carrier. Suitable carriers include polar and nonpolar solvents, e.g., organic solvent based carriers. Preferably, the carrier is prepared with sufficient viscosity to allow the composition to remain on treated articles or surfaces, for a sufficient time period to remove contaminants. In addition, the artisan will appreciate that the carrier or solvent is preferably selected to be miscible with the toxic agent to be treated and/or to be miscible with any composition or carrier in which the toxic agent is dissolved or suspended.

In another embodiment of the invention, the reactive sorbent is dispersed as a composition that includes the sorbent in the form of a dry powder or dust onto contaminated articles or surfaces.

In yet another embodiment of the invention, the reactive sorbent is dispersed in the form of solid pellets, and/or in the form of a granulate formed from a powder or dust form of the composition. Such granulated particles, e.g., pellets, can range in size, for example, from sub-millimeter scale beads or grains, up to granules ranging in size from about 1 to about 4 mm, or greater. These optional larger sizes are useful for easy distribution of sufficient quantities of the sorbent for decontaminating surfaces containing standing liquids, such as small pools or puddles of water or other solvent, e.g., including spilled fuel and the like. Depending on the nature of the area or equipment to be decontaminated, the granulate is optionally formulated by art-known methods so as to disperse when contacted by the liquid being treated. In a further embodiment, granules that disperse into a powdered form upon contact with a liquid solvent, further include any art-known thickener or gelling agent, to aid in the immobilization of standing liquids suspected of containing toxic contaminants.

In another preferred embodiment, the granulated form is optionally formulated so as to remain cohesive, while adsorbing or absorbing a liquid suspected of containing toxic agents. Advantageously, the used sorbent in granulate form is readily scooped or shoveled off the treated surface, for further processing or disposal.

The artisan will appreciate that selection of the form in which the inventive composition is dispersed will depend upon the physical form of the contaminant(s), the nature of the terrain and/or equipment or personal needing decontamination, and the practical needs of distribution and removal of the used or spent sorbent.

For purposes of the present invention, it will be understood by those of ordinary skill in the art that the term "sufficient" as used in conjunction with the terms "amount", "time" and "conditions" represents a quantitative value that provides a satisfactory and desired result, i.e., detoxifying toxic agents or decontaminating surfaces which have been in contact with toxic agents. The amounts, conditions and time required to achieve the desired result will, of course, vary somewhat based upon the amount of toxic agent present and the area to be treated. For purposes of illustration, the amount of sorbent required to decontaminate a surface will generally be, at minimum, an amount which is sufficient to cover the affected area surface. As will be readily understood by those of ordinary skill in the art, the time required to achieve satisfactory detoxification or neutralization will be temperature dependent. Generally, for purposes of the present invention, the range of time required to achieve neutralization will range from about several minutes to about 24 hours or even greater, if necessary. The conditions required for carrying out the claimed methods can generally be described as ambient environmental conditions. For example, the methods are applied at temperatures ranging from, e.g., about −30° to about 49° C.

The following examples are provided to illustrate several embodiments of the invention, but are not meant in any way to restrict the scope of the invention.

EXAMPLE 1

Materials and Methods

The reaction and degradation of CW agents and simulants by silver-exchanged zeolite (AgY) and NaY zeolite was tested and confirmed by instrumental analysis of the resulting reaction end-products, using the following materials and testing methods.

A. Materials

Silver-exchanged zeolite (AgY, Cat. No. 33,444-8, Lot No. 00817HQ, page 1046 of Aldrich catalog (1996–1997 edition, incorporated herein by reference) and NaY zeolite (Cat. No. 36,660-9, Lot No. CN10121AG, page 1321 of Aldrich catalog (1996–1997 edition, incorporated herein by reference) were obtained from Aldrich and used as received. The AgY and NaY zeolite contained 13 and 20 wt % water, respectively, as determined by weight loss at 125° C. O,S-diethyl phenylphosphonothioate (DEPPT) was prepared by Dr. Frederick J. Berg, ECBC (Berg et al., 1994, *Proceedings of the* 1993 *ERDEC Scientific Conference on Chemical Defense Research*, ERDEC-SP-024, U.S. Army ERDEC: Aberdeen Proving Ground, Md., pp. 331–336) and $^{13}$C-labeled 2-chloroethyl phenyl sulfide (CEPS*, labeled only at the methylene carbons) was obtained from Prof. Douglass F. Taber, U. of Delaware (Taber et al., 1994, *Proceedings of the* 1993 *ERDEC Scientific Conference on Chemical Defense Research*, ERDEC-SP-024, U.S. Army ERDEC: Aberdeen Proving Ground, pp. 337–340). $^{13}$C-labeled 2,2'-dichloroethyl sulfide (HD*) was prepared by Dr. Louis P. Reiff, ECBC, (Beaudry, et al., 1994, *J. Mol. Catal.* 93: 221–231) and contained an 8% impurity of $CH_3C(O)OCH_2CH_2SCH_2CH_2Cl$. An authentic sample of degradation product ethyl 2-(diisopropylamino)ethyl methylphosphonate ("QB") was provided by Mr. David I. Rossman, ECBC.

B. Procedure for Reacting or Degrading Tested Materials

In a typical run, 5 wt % neat, liquid agent or simulant (10–20 μl) was injected via syringe into the middle of a column of zeolite (200–350 mg; either AgY or NaY) contained in a MAS NMR rotor. The rotor was then sealed with the end-cap. MAS NMR spectra were obtained periodically to monitor the reaction in situ at 24° C. (room temperature) for periods of hours to months, and samples of the reaction product were obtained by extraction with either acetonitrile or 1N HCl in 50 vol % acetonitrile/water. The extracted products were analyzed by NMR and gas chromatgraphy-mass spectroscopy ("GC-MS").

1. Analysis by NMR

Substrate degradation was confirmed by magic angle spinning nuclear magnetic resonance ("NMR"). A thorough description of this method is provided, for example, by Harris, 1983, *Nuclear Magenetic Resonance Spectroscopy, a Physicochemical View* Chapter 6, pages: 143–145, Pitman Publishing, Inc., the disclosure of which is incorporated by reference herein. In particular, $^{31}$P and $^{31}$C MAS NMR spectra were obtained directly from the samples in-situ using a Varian Unityplus 300 NMR spectrometer equipped with a Doty Scientific 7 mm High Speed VT-MAS probe, using direct excitation (i.e., no Cross-Polarization) and high-power proton decoupling. The observation frequencies for $^{31}$P and $^{31}$C were 121 and 75 MHz, respectively. Double o-ring sealed macor rotors (Doty Scientific) were used for samples containing VX and HD to ensure safe containment of possible agent vapors. Zirconia rotors employing Kel-F end-caps sealed with Teflon™ tape were used for DEPPT and CEPS, as described by, Beaudry, et al., 1994. *J. Mol. Catal.* 93, 221–231, the disclosure of which is incorporated by reference herein. The rotors were typically spun at 3000 Hz during the procedures. Chemical shifts were referenced to external 85% $H_3PO_4$ and TMS (0 ppm).

Solution NMR spectra were obtained on the same instrument using either a standard 5 mm broadband probe (Varian) or a 5 mm broad-band inverse-detection probe (Nalorac) for heteronuclear multiplequantum coherence ("HMQC") experiments. A thorough description of this latter method is provided, for example, by Bax et al., 1989, *J. Magnetic Resonance*, 85:393, the disclosure of which is incorporated by reference herein.

2. Analysis by GC-MS of Silver Zeolite Treated Vx

A Finnigan TSQ-7000 triple quadrupole GC/MS/MS (ThermoQuest, San Jose, Calif.) equipped with a 30 m×0.25 mm Rtx-5ms capillary column (Restek, Bellefonte, Pa.) was used to detect and identify VX degradation products. The helium carrier gas flow was 1 mL/min. The oven temperature was programmed from 60–270° C. at 15° C./min with a 10 min hold at 270° C. The manifold temperature was 150° C. and the GC/MS interface and injection port temperatures were 250° C. The mass range was scanned from 45–450 daltons at 0.7 s/scan in the electron ionization mode. The electron energy was 70 eV and the emission current was 400 μA. A more detailed description of GC-MS analytical methods is provided, for instance, by "Gas Chromatography and Mass Spectrometry: A Practical Guide", Fulton G. Kitson, Barbara S. Larsen, and Charles N. McEwen, San Diego: Academic Press, 1996, the disclosure of which is incorporated by reference herein.

C. Product Identification and Confirmation of Degradation

In cases where ambiguity existed in the identification of products solely on the basis of the MAS NMR spectra, solvent extraction followed by solution NMR and/or GC-MS analysis was performed. For ionic species such as CH—GT and ethyl methylphosphonate ("EMPA") a particularly effective extraction medium proved to be 1N HCl in 50 vol % acetonitrile/water. Ethyl phenylphosphonic acid (EPPA) was identified by NMR and GC-MS (in TMS-derivatized form). Neat acetonitrile was used to extract neutral species such as 1,4-thioxane and QB (this is diisopropylamino)ethyl methylphosphonate). 1,4-thioxane and $PhSCH_2CH_2OCH_2CH_2SPh$ (where Ph is phenyl group) were characterized by NMR and positively identified by GC-MS. The QB product was unexpected, and was positively identified by GC-MS, and further characterized by inverse-detected $^{13}$P HMQC NMR experiments, as described supra, which revealed the two distinct P—OR groups. The identity of the QB product was confirmed by obtaining the identical HMQC spectra from a known standard comprising QB. Additionally, loading AgY with the QB standard afforded a $^{31}$P MAS NMR spectrum identical to that of the QB product derived from VX, thus confirming that QB is formed by the breakdown of VX on AgY, as well.

EXAMPLE 2

Reaction and Degradation of Toxins On AgY and NaY

Degradation of VX

A sample of 15 μl VX was added to 276.1 mg AgY and 11 μl VX added to 198.7 mg NaY and the reactions were allowed to proceed for a month and 24 h, respectively as described in Example I(B), above.

Selected $^{31}$P MAS NMR spectra were obtained for the degradation of VX as described above. In initial spectra, a sharp peak is observed for unreacted VX at 52.6 ppm on AgY and 52.3 ppm on NaY. Testing of reaction products generated by VX passed through AgY resin uncovered a sharp EMPA product peak that initially emerged at 22.5 ppm, followed by a second, sharp product peak at 30.2 ppm, that was identified as QB (see above). The sharpness of the EMPA peak was consistent with the formation of the relatively mobile silver salt of EMPA (see Discussion). No toxic S-[2-(diisopropylamino)ethyl] methylphosphonothioic acid (EA-2192)

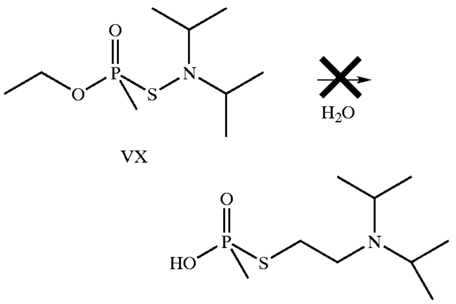

VX

EA-2192

+ EtOH was observed. EA-2192 is known to form via P—O cleavage in basic solutions (Yang, Y. -C. 1999, *Acc. Chem. Res.* 32:109–115), as shown in the following reaction scheme.

The QB peak eventually (as the reaction proceeds) becomes two peaks at 32.3 and 30.4 ppm, and assigned to protonated and non-protonated QB, respectively. These species are also observed for authentic QB on AgY. Owing to fast proton exchange in solution, only a single averaged species is detected for the extracted QB product. Over time, the sharp peak for the proposed Ag-EMPA salt disappears and the QB peak continues to increase, as does a new, broad peak at about 20 ppm. The broad peak is consistent with precipitation of $Ag_2S$ and concomitant binding of released EMPA to either the zeolite framework or exterior surface (see Discussion).

On NaY the MAS-NMR curve (data not shown) displayed a broad EMPA peak at 30.1 ppm. A second broad peak emerged at 63.6 ppm, which was assigned to VX inside the zeolite cage.

The MAS-NMR curve (data not shown) for DEPPT on NaY also revealed an intrazeolite species. Reaction profiles for the decomposition of VX on AgY and NaY are shown in FIG. 1. As indicated by the data plotted in FIG. 1, decomposition of VX was much faster on AgY (solid triangles) than on NaY (open triangles), and both reactions slow after several hours to achieve a steady-state reaction exhibiting first-order behavior. The half-lives for the steady-state reactions are given in Table 1, below.

TABLE 1

Steady-State Half-Lives at 24° C.

| Compound | AgY | NaY |
|---|---|---|
| VX | >6.6 h | >5.0 days[a] |
| DEPPT | >41 h | no reaction |
| HD | 20 days | 6.7 days |
| CEPS | >7.4 days[a] | 23 h |

[a]Lower limit, reaction not monitored over a sufficient period to assure steady state achieved.

B. Degradation of DEPPT

The degradation of DEPPT was conducted as described in Example 1, above. 18 μl (~18 mg) DEPPT (Neat liquid) was added to 0.3438 g (343.8 mg) AgY and 12 μl (~12 mg) DEPPT (Neat liquid) was added to 0.2283 g (228.3 mg) NaY. Degradation of DEPPT was confirmed by detection of breakdown products on $^{31}$P MAS NMR spectra (NMR curves not shown), taken as described above for Example 1.

On AgY the MAS NMR DEPPT peak is at 42.9 ppm, and a sharp peak was also observed at 9.5 ppm for the apparent, mobile silver salt of the ethyl phenylphosphonic acid (EPPA) hydrolysis product. No species due to the P—O hydrolysis product (S-ethyl phenylphosphonothioate) was observed. Unlike VX, the Ag-EPPA salt does not undergo further transformation to yield desulfurized DEPPT. The Ag-EPPA salt evidently decomposes over time (possibly owing to formation of AgSEt), because a new, broad peak at 16.3 ppm, assigned to framework/surface bound EPPA, was observed. A smaller broad peak at −1.3 ppm has been tentatively assigned to framework/surface bound phenylphosphonic acid.

On NaY, no reaction was observed; the sharp MAS-NMR DEPPT peak (NMR curves not shown) at 43.2 ppm was merely replaced by a broad, shifted peak at 52.0 ppm, assigned to DEPPT inside the zeolite cage. As seen for VX, the DEPPT reaction on AgY was much faster than on NaY. Also, like VX the DEPPT decomposition on AgY slows to a steady-state rate as shown in the reaction profile in FIG. 1 (solid circles). The half-life for the steady-state reaction is given in Table 1 (supra).

C. Degradation of HD

The degradation of HD was conducted as described in Example 1, above. 12 μl (~15.2 mg) HD* ($^{13}$C-labeled, Neat liquid) was added to 0.2650 g (265.0 mg) AgY and 9 μl (~11.4 mg) HD* ($^{13}$C-labeled, Neat liquid) was added to 0.3438 g (343.8 mg) AgY. Degradation of HD was confirmed by detection of breakdown products on $^{31}$P MAS NMR spectra (NMR curves not shown), as described above for Example 1.

Figure 2:
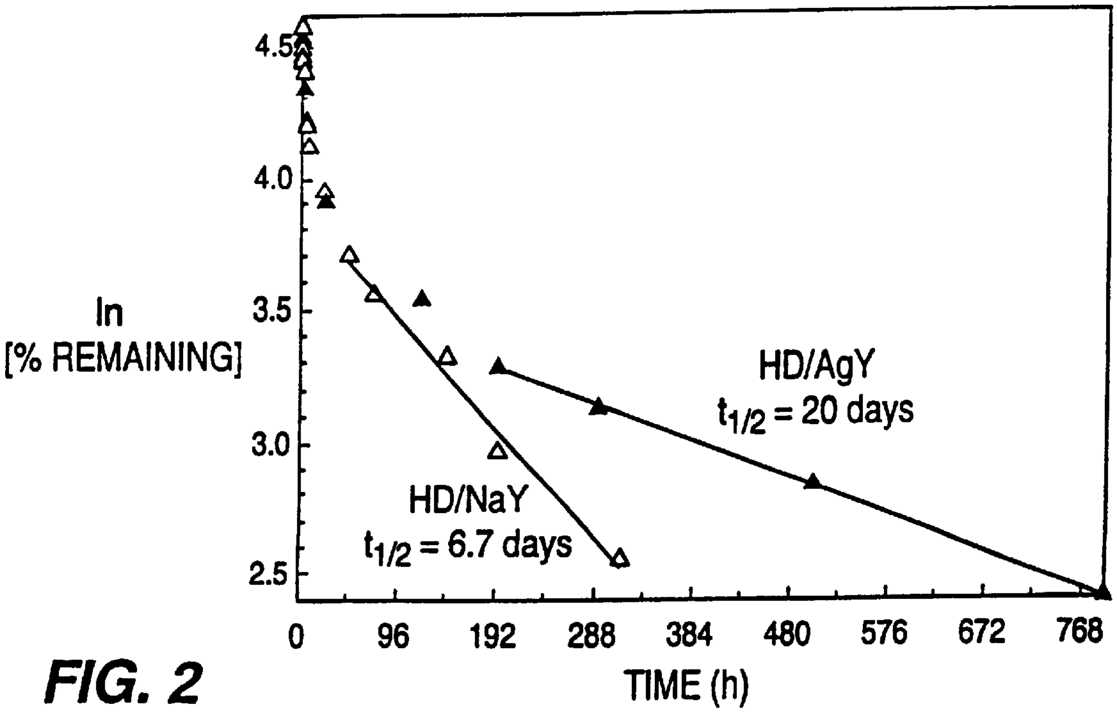
FIG. 2. Reaction profiles are plotted as (natural) log of the % of the initial substance remaining (Y-axis) against time (hours, X-axis), for HD on AgY having a $t_{1/2}$ of 20 days (solid triangles); HD on NaY having a $t_{1/2}$ of 6.7 days (open triangles).

The HD* $^{31}$P MAS NMR peaks were observed at 44.6 and 35.5 ppm on both AgY and NaY. A sharp peak was observed at 64.4 ppm, which is thought to be due to an impurity. On AcY, sharp product peaks were evident for divinyl sulfide (DVS, 130.7 and 115.7 ppm), 2-chloroethyl vinyl sulfide (CEVS, 132.1, 113.3, ca. 44.5, ca.35.5 ppm) and 1,4-thioxane (73.0, 29.8 ppm). On NaY, six broad peaks emerged at 62.0, 57.7, 45.6, 43.4, 35.4 and 27.7 ppm for the CH—GT product. As illustrated by FIG. 2, unlike the results for VX and DEPPT, HD decomposition was much faster on NaY (open triangles) than on AgY (solid triangles). The steady-state half-lives are consistent with this result, and are given in Table 1 (supra).

D. Degradation of CEPS

The degradation of CEPS was conducted as described in Example 1, above. 15 μl (~17.7 mg) CEPS* ($^{13}C$-labeled, Neat liquid) was added to 0.3401 g (340.1 mg) AgY and 11 μl (~13 mg) CEPS* ($^{13}C$-labeled, Neat liquid) was added to 0.2333 g (233.3 mg) NaY. Degradation of CEPS was confirmed by detection of breakdown products on $^{31}P$ MAS NMR spectra (NMR curves not shown), as described above for Example 1.

Figure 3:
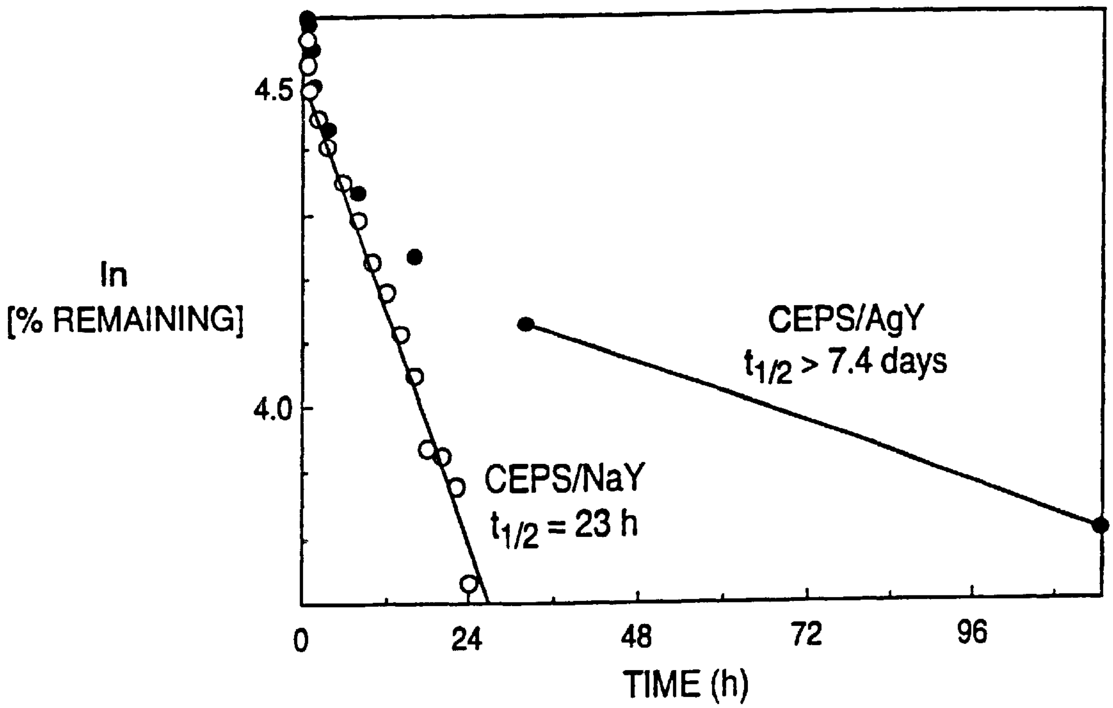
FIG. 3. Reaction profiles are plotted as (natural) log of the % of the initial substance remaining (Y-axis) against time (hours, X-axis) for CEPS* ($^{13}$C-labeled CEPS) reactions with AgY and NaY. The curves are labeled as follows: CEPS on AgY having a $t_{1/2}$ of greater than 7.4 days (solid circles); CEPS on NaY having a $t_{1/2}$ of 23 hours (open circles).

The $^{13}C$ MAS NMR spectra obtained for the samples show sharp peaks for the $^{13}C$-labeled methylene carbons at 43.2 and 36.7 ppm, and 43.1 and 36.8 ppm on AgY and NaY, respectively. For CEPS on AgY, sharp peaks were observed for the $PhSCH_2CH_2OCH_2CH_2SPh$ (Ph=phenyl group) product at 71.5, 43.0, 36.4 and 30.9 ppm. No other product is detected. On NaY, sharp MAS-NMR peaks were observed for the hydrolysis product 2-hydroxyethyl phenyl sulfide (HEPS) at 61.3 and 36.6 ppm. No other product was detected. Reaction profiles are shown in FIG. 3 and half-lives for the steady-state reactions are shown Table 1 (supra). As with HD, the CEPS reaction was much faster on NaY (open circles) than on AgY (solid circles).

INCORPORATION BY REFERENCE

Numerous references are cited throughout this document, and the disclosures of each and every cited reference are hereby incorporated by reference herein in their entireties.

What is claimed is:

1. A method of decontaminating surfaces exposed to chemical warfare agent, which comprises contacting said surfaces with a sufficient amount of a reactive sorbent comprising silver-exchanged zeolite for a sufficient time to degrade substantially all of said chemical warfare agent, wherein said chemical warfare agent is selected from the group consisting of bis-(2-chloroethyl)sulfide, O-ethyl S-(2-diisopropylamino)ethyl methylphosphonothiolate, pinacolyl methylphosphonofluoridate, isopropyl methylphosphonofluoridate, and combinations thereof.

2. The method of claim 1, wherein said chemical warfare agent comprises bis-(2-chloroethyl) sulfide.

3. The method of claim 1, wherein said chemical warfare agent comprises O-ethyl S-(2-diisopropylamino)ethyl methylphosphonothiolate.

4. The method of claim 1, wherein said chemical warfare agent further includes a polymer selected from the group consisting of polyacrylic acid, polycarbonate, polystyrene and mixtures thereof, and wherein said chemical warfare agent is present in a concentration from about 90 to about 99 percent by weight.

5. The method of claim 1, wherein said silver zeolite reactive sorbent contacts said chemical warfare agent for a time ranging from about 1 minute to about 60 days, and at a temperature ranging from about −30° to about 50° C.

6. The method of claim 5, wherein said silver zeolite reactive sorbent contacts said chemical warfare agent for a time ranging from about 1 minute to about 24 hours.

7. The method of claim 1, wherein said silver zeolite reactive sorbent is in a form selected from the group consisting of a powder, pellets, granulates, a slurry comprising a sorbent powder suspended in a compatible solvent, and combinations thereof.

8. The method of claim 7, wherein said granulates further include thickening or gelling agents to aid in the immobilization of standing liquids.

9. The method of claim 7, wherein said compatible solvent is further selected to be miscible with said chemical warfare agent, and said compatible solvent is selected from the group consisting of hexane, fluorohydroethers, alcohols, ethers and combinations thereof.

10. The method of claim 1, wherein said silver zeolite has a silver content ranging from about 10 to about 40% wt/wt silver.

11. The method of claim 1, wherein said contacting is carried out by a method selected from the group consisting of spraying, rubbing, brushing, dipping, blotting and dusting.

* * * * *